(12) United States Patent
Cattoen et al.

(10) Patent No.: US 9,080,847 B2
(45) Date of Patent: Jul. 14, 2015

(54) INTERFEROMETRIC DEVICE WITH EXTRINSIC OPTICAL FIBER FOR MEASURING A PHYSICAL PARAMETER

(75) Inventors: Michel Cattoen, Toulouse (FR); Han Cheng Seat, Toulouse (FR)

(73) Assignee: INSTITUT NATIONAL POLYTECHNIQUE DE TOULOUSE, Toulouse (FR)

( * ) Notice: Subject to any disclaimer, the term of this patent is extended or adjusted under 35 U.S.C. 154(b) by 136 days.

(21) Appl. No.: 13/810,453

(22) PCT Filed: Jul. 27, 2011

(86) PCT No.: PCT/EP2011/062890
§ 371 (c)(1),
(2), (4) Date: Feb. 8, 2013

(87) PCT Pub. No.: WO2012/013698
PCT Pub. Date: Feb. 2, 2012

(65) Prior Publication Data
US 2013/0128278 A1  May 23, 2013

(30) Foreign Application Priority Data
Jul. 28, 2010 (FR) ...................... 10 56230

(51) Int. Cl.
*G01B 9/02* (2006.01)
(52) U.S. Cl.
CPC .............. *G01B 9/02* (2013.01); *G01B 9/02002* (2013.01); *G01B 9/02027* (2013.01); *G01B 9/02057* (2013.01)
(58) Field of Classification Search
USPC .......................................... 356/482, 450, 477
See application file for complete search history.

(56) References Cited

U.S. PATENT DOCUMENTS

| | | | | |
|---|---|---|---|---|
| 5,402,236 A | * | 3/1995 | Brown et al. | 356/482 |
| 7,139,446 B2 | * | 11/2006 | Slotwinski | 385/12 |
| 2007/0247632 A1 | | 10/2007 | Franz et al. | |

FOREIGN PATENT DOCUMENTS

| | | |
|---|---|---|
| EP | 0 144 510 | 6/1985 |
| WO | 2010/030884 | 3/2010 |

OTHER PUBLICATIONS

International Search Report dated Sep. 6, 2011, corresponding to PCT/EP2011/062890.
Hang Cheng Seat, et al.; "An Extrinsic Fiber Fabry-Perot Interferometer for Dynamic Displacement Measurement"; Aug. 1, 2007; pp. 3025-3030.

* cited by examiner

*Primary Examiner* — Tri T Ton
(74) *Attorney, Agent, or Firm* — Young & Thompson (57) ABSTRACT

An extrinsic optical fiber device for measuring a physical parameter, includes: a light source, of central wavelength $\lambda$, an optical fiber projecting, a unit for detecting an interferometric signal, the interferometric signal including the information about the physical parameter to be determined, elements for modulating a signal emitted by the light source, elements for calculating the physical parameter on the basis of the interferometric signal measured by the detection unit. The modulated signal from the light source includes an alternating component including a double frequency modulation generated by the modulation elements. The main application of this device is the measurement of the displacement of a target.

12 Claims, 6 Drawing Sheets

INTERFEROMETRIC DEVICE WITH EXTRINSIC OPTICAL FIBER FOR MEASURING A PHYSICAL PARAMETER

BACKGROUND OF THE INVENTION

This invention relates to the field of optical fiber optoelectronic devices. More specifically, the invention relates to an extrinsic Fabry-Perot type of optical fiber interferometric device for measuring physical parameters such as the displacement of a target.

Optical fiber interferometric devices have many applications, and can be used for measuring temperature, stress, pressure, or vibration, for example.

Optical fiber interferometric devices can be classified into two categories:
- intrinsic interferometric devices wherein the optical fiber is the transducer and is used to quantify the desired physical dimension,
- extrinsic interferometric devices wherein the optical fiber used is not the transducer and only plays the role of medium for transmitting a light beam from one point to another. This type of device thus makes it possible to remote the optoelectronic components out of the measurement area.

DESCRIPTION OF THE RELATED ART

Among the existing extrinsic interferometric devices one can cite the extrinsic Fabry-Perot interferometric device, called the EFPI device, which is based on the combination of two light beams and can be approximated to a two-beam interferometer. In contrast to Mach-Zehnder or Michelson types of interferometers, a Fabry-Perot interferometer makes it possible to overcome external disturbances over the fiber called the measurement fiber.

Figure 1A:
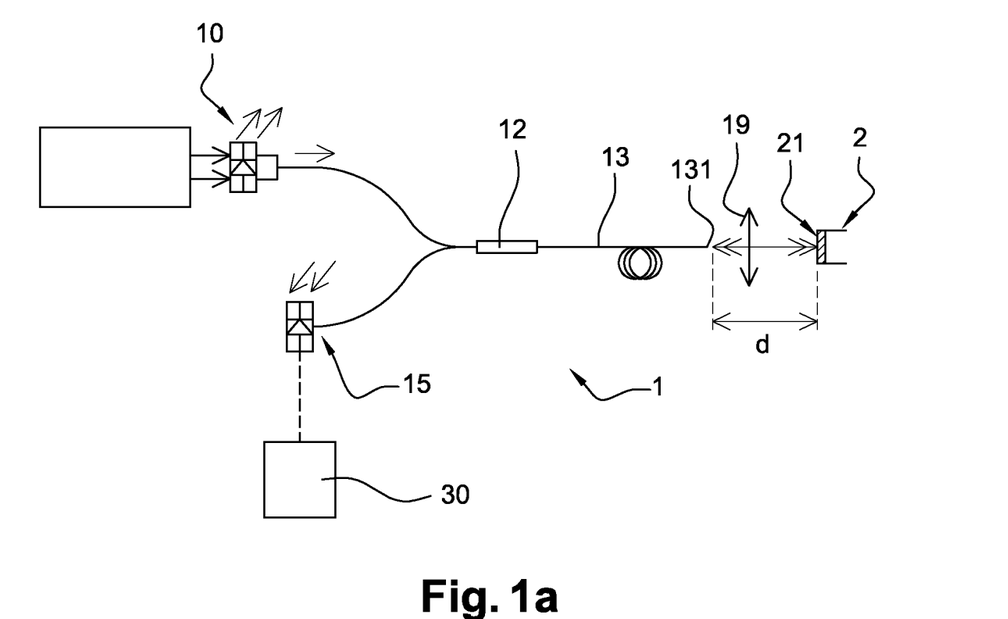
FIG. 1a, already mentioned, illustrates a schematic diagram of a device for measuring the displacement of a target according to the prior state of the art, FIG. 1b, already mentioned, illustrates an enlargement of the Fabry-Perot cavity of FIG. 1a, FIG. 2 illustrates a schematic diagram of the measuring extrinsic optical fiber device in a first embodiment of the invention.

A typical EFPI device comprises, as shown in FIG. 1a, a light source 10, generally a diode laser type of laser light source, a coupler 12, an optical fiber 13, preferably monomode, a collimator 19, a reflective target 2, the Fabry-Perot optical measurement cavity being formed by the target 2 and an extremity 131 of the optical fiber opposite the extremity facing the light source, a photo-detector 15 for detecting an interferometric optical signal and means of processing 30 said interferometric signal.

Figure 1B:
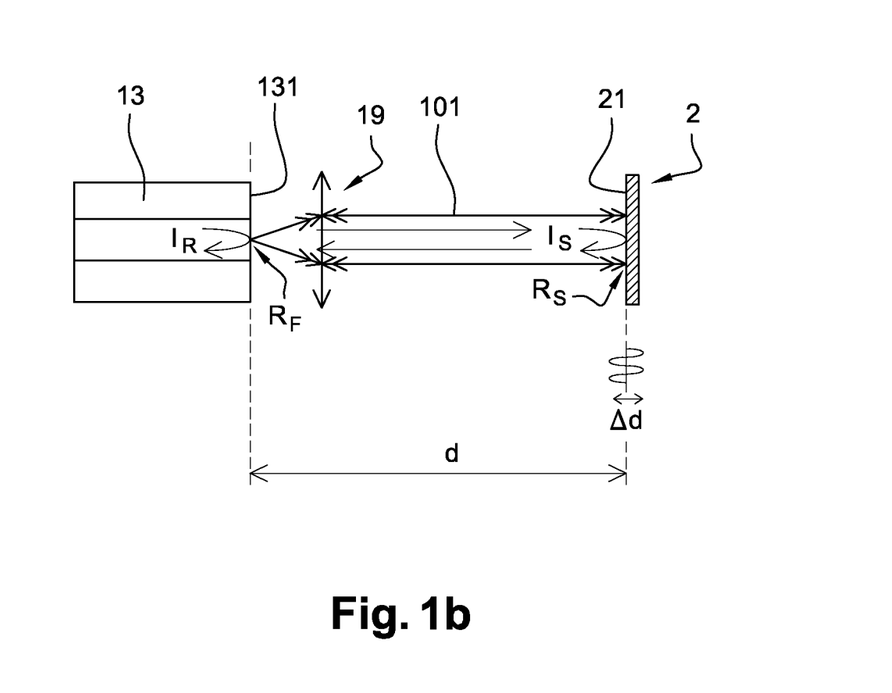

The Fabry-Perot cavity is more specifically illustrated by the enlarged FIG. 1b.

When it is required, for example, to measure a displacement of the target, the operating principle of the EFPI device is as follows:

The light source 10 emits a quasi-monochromatic light beam, at constant power, in the direction of the target 2 via the optical fiber 13. When the light beam arrives at the extremity 131 of the optical fiber, at a fiber-air interface, when the air is the medium wherein the target 2 is located, a portion of the beam, called the reference beam, is reflected at said fiber-air interface, represented in FIG. 1b by a reflection coefficient $R_F$, with an optical intensity $I_R$, here called the reference intensity. The light beam that is not reflected, called the measurement beam 101, is transmitted and propagates in the Fabry-Perot optical cavity up to the reflective target 2, located at a distance d from the fiber-air interface, and having a reflection coefficient $R_S$. The measurement beam 101 is reflected by the target and re-injected into the optical fiber 13 with an optical intensity $I_S$, here called the measurement intensity.

When the target 2 moves, the reference and measurement beams interfere, creating a sine wave signal or a series of interferometric fringes with an optical intensity given by the following formula:

$$I = I_R + I_S + 2\sqrt{I_R I_S}\cos(\theta) \quad (1)$$

where $\theta$ is the phase difference between the reference intensity $I_R$ and the measurement intensity $I_S$.

For a round-trip optical path in the Fabry-Perot cavity, the phase difference $\theta$ can be calculated by:

$$\theta = \frac{4\pi n}{\lambda} d \quad (2)$$

where n is the refractive index of the optical cavity medium (n≈1 for air) and $\lambda$ is the wavelength of the light source 10.

The measurement of the phase difference $\theta$ should enable the distance d of the target to be determined. However, the phase difference $\theta$, according to the cosine formula (1), can only be determined modulo $\pi$. Therefore, it is not possible to determine the absolute distance d, but only variations in distance, or displacement $\Delta d$, of the target. In addition, it is not possible to determine the direction of this displacement, i.e. whether the target is moving towards the extremity of the optical fiber or away from it.

The photo-detector 15 detects the variation in optical intensity/generated by the interference of said beams (reference and measurement) when the target moves and converts it into an electrical signal, e.g. of voltage, comprising interference fringes that are a function of the target's displacement.

The interferometric signal measured by the photo-detector can be expressed by the following formula:

$$V = V_0 + V_m \cos(\theta) \quad (3)$$

where V is the voltage of the converted interferometric signal, $V_0$ is the DC (direct current) component and $V_m$ is the AC (alternating current) component.

Suitable processing means 30 allow the phase difference $\theta$ to be determined based on the previous relationship (3) by measuring the signal V and identifying the parameters $V_0$ and $V_m$:

$$V_0 = \frac{V_{max} + V_{min}}{2} \quad (4)$$

$$V_m = \frac{V_{max} - V_{min}}{2}$$

where $V_{max}$, $V_{min}$ are respectively the maximum and minimum amplitudes of the signal V.

Many techniques, based on the principle of demodulation and known to the person skilled in the art, can be used to remove the ambiguity as to the direction of the target's displacement. These techniques, called quadrature, are based on the use, for example, of two light sources with different wavelengths, or the polarization of light.

Generally these quadrature techniques lead to obtaining two signals, called $V_x$ and $V_y$, calculated to be found in quadrature phase and being expressed as:

$$V_x = V_{0x} + V_{mx}\cos(\theta) \quad (5a)$$

$$V_y = V_{0y} + V_{my}\sin(\theta) \quad (5b)$$

where $V_x$ is the voltage of a first signal, $V_{0x}$ is the direct component of the first signal, $V_{mx}$ is the alternating component of the first signal, $V_y$ is the voltage of a second signal, $V_{0y}$ is the direct component of the second signal and $V_{my}$ is the alternating component of the second signal.

The identification of the four parameters $V_{0x}$, $V_{0y}$, $V_{mx}$ and $V_{my}$ in the two relationships (5a) and (5b) and the measurement of the signals $V_x$ and $V_y$ make it possible to obtain the phase difference $\theta$ modulo $2\pi$ and thus to remove the ambiguity as to the direction.

To determine these four parameters $V_{0x}$, $V_{0y}$, $V_{mx}$ and $V_{my}$, one known method is based on measuring minima and maxima of the electrical signals $V_x$ and $V_y$. The four parameters are thus calculated from the following formulas:

$$V_{0x} = \frac{V_{x\_max} + V_{x\_min}}{2} \quad (6a)$$

$$V_{0y} = \frac{V_{y\_max} + V_{y\_min}}{2} \quad (6b)$$

$$V_{mx} = \frac{V_{x\_max} - V_{x\_min}}{2} \quad (6c)$$

$$V_{my} = \frac{V_{y\_max} - V_{y\_min}}{2} \quad (6d)$$

where $V_{x\_max}$, $V_{x\_min}$, respectively $V_{y\_max}$, $V_{y\_min}$, are the maximum and minimum amplitudes of the electrical signal $V_x$, respectively $V_y$.

The existing quadrature techniques advantageously make it possible to determine the direction of the target's displacement but have a significant limitation: they only work in the presence of at least one complete interference fringe. This limitation is reflected in terms of the target's displacements by displacements with amplitudes greater than the half-wavelength of the light source. Consequently, for amplitudes of the target's displacements less than the half-wavelength of the light source it is impossible to determine the target's displacement and also its direction of displacement.

In addition, these quadrature techniques have the disadvantage of requiring the addition of optical components in the interferometric device, which generates considerable additional costs and makes the production of the interferometric device more complex.

SUMMARY OF THE INVENTION

A goal of the invention is therefore to propose a device allowing a physical parameter and its direction to be determined, even when this physical parameter has an amplitude of variation that is less than the half-wavelength of the light source.

To this end, the subject of this invention is an extrinsic optical fiber device for measuring a physical parameter, comprising:
- a light source, of central wavelength $\lambda$, to generate a light beam in the direction of a target,
- an optical fiber to transport and guide the light beam, called the measurement fiber, towards a target,
- a means for detecting an interferometric signal, said interferometric signal comprising the information about the physical parameter to be determined,
- means for modulating a signal emitted by the light source,
- means for calculating the physical parameter on the basis of the interferometric signal measured by the detection means.

One extremity of the measurement fiber, called the free extremity, is placed facing the target and forms with said target a cavity, called Fabry-Perot cavity.

The light beam coming from the light source travels, in the Fabry-Perot cavity, an optical path whose variation is a function of the physical parameter to be determined.

The optical path is defined as a geometric distance traveled by the light beam reported to the refractive properties of the medium that the light beam traverses, i.e. by multiplying this geometric distance by the refractive index of the medium. In an example where the medium is air, the optical path therefore corresponds to the round-trip distance between the free extremity of the measurement fiber and the target.

The physical parameter to be determined, modifying the beam's optical path in the Fabry-Perot cavity is, for example, a refractive index variation of the medium wherein the target is located, and preferably a displacement of the target in movement.

According to the invention, the light source emits a wavelength modulated signal in order to determine the physical parameter. To cause a wavelength modulation, the amplitude of the current of the light source is modified. In effect, for a given temperature, the light source's wavelength is substantially proportional to the light source's current. However, the signal current modulation of the light source is accompanied by a variation in the power of said light source, which leads to a variation in the amplitude of the current detected by the detection means, a parasitic variation that must be overcome by suitable means.

This modulated signal comprises a direct component and an alternating component, said alternating component comprising a double frequency modulation, equivalent to a double wavelength modulation, generated by the modulation means.

The double modulation of the alternating component of the modulated signal emitted by the light source consists of:
- a first modulation, high frequency and low modulation amplitude, of the current of the light source,
- a second modulation, low frequency and high modulation amplitude, of the current of the light source.

This double modulation will make it possible to measure the physical parameter and its direction, regardless of its amplitude of variation.

In effect, in order to reconstitute the physical parameter and its direction by demodulation, the parameters $V_{x\_max}$, $V_{x\_min}$, $V_{y\_max}$, $V_{y\_min}$ must be obtained.

In the case known as general, where the physical parameter's amplitude of variation is greater than the half-wavelength of the light source, the first (high-frequency) modulation is sufficient in itself because the interferometric signal detected by the detection means comprises at least one complete interference fringe. The parameters $V_{x\_max}$, $V_{x\_min}$, $V_{y\_max}$, $V_{y\_min}$ can be measured directly and it is possible in this way to reconstitute the target's displacement and its direction.

In the case known as special, where the physical parameter's amplitude of variation is less than the half-wavelength of the light source, the interferometric signal detected by the detection means does not comprise a complete interference fringe. The parameters $V_{x\_max}$, $V_{x\_min}$, $V_{y\_max}$, $V_{y\_min}$ cannot be measured directly. The second (low-frequency) modulation of the modulated signal will make it possible to create at least one artificial complete interference fringe in order to obtain the parameters $V_{x\_max}$, $V_{x\_min}$, $V_{y\_max}$, $V_{y\_min}$ and then reconstitute the target's displacement and its direction.

The second modulation can be emitted either continuously or intermittently, at the beginning of or during acquisition. In order to determine the actual displacement of the target, it is sufficient to subtract the artificial displacement from the displacement measured.

It is clear, in the light of the description, that the light source is single and that the double frequency (and, by equivalence, wavelength) modulation of the signal is applied to the light source and that the light beam emitted by said light source is doubly modulated before its introduction into an optical fiber placed facing the light source, and thus before its introduction into the measurement fiber.

The light source emits the modulated light beam, which is guided in the direction of the target, through the measurement fiber to its free extremity, which reflects a fraction of it, called the reference beam. The remaining fraction of the light beam, called the measurement beam, propagates in the Fabry-Perot optical cavity to the target. The measurement beam is reflected by the target and re-injected, fully or in part, into the measurement fiber producing, with the reference beam, interferences in the measurement fiber.

When the double modulation is applied directly to the light source to allow the device to measure a physical parameter and its direction, regardless of its amplitude of variation, there is therefore no need to use additional optical (such as, for example, an acousto-optic or electro-optic modulator) and/or mechanical (such as, for example, a piezoelectric transducer) components. The measurement device thus realizes gains in terms of cost, dimensions, robustness (no fragile components and even less of thermo-mechanical insulation of these components) and simplicity of realization.

Advantageously, the double modulation makes it possible to measure all the amplitudes of variation of the physical parameter, irrespective of whether they are greater than or less than the half-wavelength of the light source.

In particular, the second modulation, which can be applied intermittently or continuously to the light source, makes it possible to overcome power variations due to the variation in the power of the light source and/or power variations due to the aging of the components used, such as, for example, the light source, the optical fibers, the connectors, the optics (collimating lens), the degradation in the target's surface condition, variations that have a much lower frequency than the frequency of the second modulation, generally less than one hertz. Thus, a suitable detection of the previously described parameters ($V_{x\_max}$, $V_{y\_max}$, $V_{x\_min}$, $V_{y\_min}$) can be carried out, providing in this way a more precise demodulation over time.

Preferably, the light source is a diode laser, for example DBR (acronym for "Distributed Bragg Reflector") or DFB (acronym for "Distributed FeedBack") type, but the use of any other type of light source such as, for example, a superluminescent diode or another laser source such as, for example, a tunable laser, is possible.

Laser source unequivocally means a source comprising an optical amplifier associated to an optical cavity, called resonator. The laser is based on the principle of stimulated emission. The beam on output from a laser source is a coherent beam.

When the optical path traveled by the measurement beam in the Fabry-Perot optical cavity varies, the reference and measurement beams interfere, generating a multiplexed interferometric signal representative of a variation in optical intensity due to the target's displacement.

The detection means, preferably a photo-detector, detects the variation in optical intensity and converts it into an electrically modulated signal, as a function of the target's displacement. This converted signal can be, for example, a voltage signal.

The calculation means then acquire the signal measured by the detection means and the high-frequency modulation signal of the light source generated by the modulation means to process them so as to obtain the measurement of the physical parameter with its direction.

The calculation means comprise:
- means for demultiplexing the signal measured by the detection means, by synchronization with the first modulation to obtain the two demultiplexed signals $V_x$ and $V_y$,
- means for amplitude compensating the demultiplexed signals $V_x$ and $V_y$,
- means for demodulating signals obtained on output from the compensation means,
- means for converting the signal obtained on output from the demodulation means to obtain the physical parameter and its direction, regardless of the amplitude variations of the physical parameter.

In a preferred embodiment, the extrinsic optical fiber device enables the measurement of a displacement of a target along an axis XX'. Said measurement device comprises:
- a light source, of central wavelength $\lambda$,
- an optical fiber,
- a means for detecting an interferometric signal, said interferometric signal comprising the information about the displacement to be determined,
- means for modulating a signal emitted by the light source,
- means for calculating the displacement on the basis of the interferometric signal measured by the detection means.

Preferably, the light source consists of a laser source.

In an example of realization, the laser source is a diode laser.

The modulated signal from the light source comprises an alternating component comprising a double frequency modulation, equivalent to a double wavelength modulation, generated by the modulation means. The double modulation of the signal is advantageously applied to the light source.

The invention also relates to a system for jointly measuring N physical parameters or one physical parameter N times, where N is greater than or equal to 2. The measurement system comprises:
- a light source, of central wavelength $\lambda$,
- N optical fibers,
- N means for detecting interferometric signals, each interferometric signal comprising the information about a physical parameter to be determined,
- means for modulating a signal emitted by the light source,
- means for calculating the physical parameter on the basis of interferometric signals measured by the N detection means.

The beam from the light source is split into N beams, and each beam propagates to a measurement fiber and a Fabry-Perot optical cavity, one of whose walls is formed by an extremity of the measurement fiber.

The modulated signal from the light source comprises an alternating component comprising a double frequency modulation, equivalent to a double wavelength modulation, generated by the modulation means. The double modulation of the signal is advantageously applied to the light source.

In this system, advantageously, the light source and the modulation means are single and common to the measurement of N physical parameters or the physical parameter N times.

This measurement system is formed by N optical cavities positioned along N substantially parallel or different axes for the joint measurement of one or N physical parameters.

The features and advantages of the invention will become apparent through the following description, which describes the characteristics of the invention in a non-limiting example of application.

BRIEF DESCRIPTION OF THE DRAWING FIGURES

The description is based on the appended figures, which represent:

FIG. 6a illustrates the demultiplexed signal $V_x$, after processing by the means for demultiplexing and compensating the signal detected by a detection means, in an example of realization of a target moving with an amplitude of variation less than the half-wavelength of the light source, FIG. 6b illustrates the demultiplexed signal $V_y$, after processing by the means for demultiplexing and compensating the signal detected by a detection means, in the same example of realization as that of FIG. 6a, FIG. 6c illustrates the target's displacement signal reconstituted via the device according to the first embodiment of the invention, in the same example of realization as that of FIG. 6a, FIGS. 7a to 7c illustrate enlargements of an acquisition area of FIGS. 6a to 6c, respectively.

DETAILED DESCRIPTION OF THE INVENTION

Figure 2:
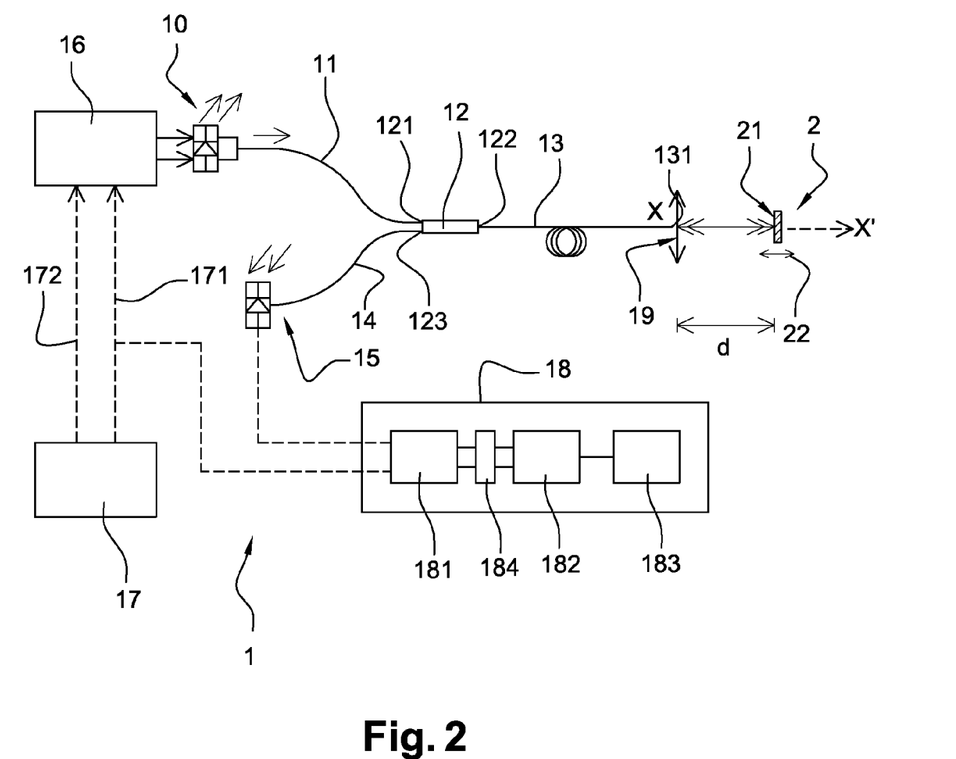

FIG. 2 illustrates schematically an extrinsic optical fiber device 1 for measuring a displacement of a target 2 according to a particular embodiment of the invention.

The example of realization of the measurement device is described in detail in its application to the case of measuring the displacement of a target 2. This choice is not limiting and the invention is also applicable to other physical parameters such as, for example, a variation in the refractive index of the medium wherein the target is located.

The following description describes more specifically the physical, operational and layout characteristics of the means of the device according to the invention making it possible to measure the specific case of the displacement of a target 2 in the air.

The extrinsic optical fiber device 1 according to the invention comprises, as illustrated in FIG. 2:
- a light source 10, to emit a light beam,
- a current generator 16 to control the light source 10,
- a first optical fiber 11, at the output from the light source 10, to transport and guide the light beam,
- a three-port optical fiber coupler 12 provided with:
    - an input port 121 for the first optical fiber,
    - a first output port 122 for a second optical fiber, called the measurement fiber 13,
    - a second output port 123 for a third optical fiber 14,
- a detection means 15, connected to the third optical fiber 14,
- a modulation means 17 connected and associated to the current generator 16 of the light source 10,
- means for calculating 18 the displacement of the target 2.

One extremity of the measurement fiber, called the free extremity 131, is facing the target 2 whose displacement is to be measured. The free extremity 131 of the measurement fiber 13 is substantially perpendicular to an optical axis XX' and is placed at a distance d from the target 2. The free extremity 131 and the target 2 form a Fabry-Perot cavity.

The light source 10, single as shown in FIG. 2, is designed to emit an optical beam of central wavelength λ.

Preferably, the light source 10 is a DFB type diode laser.

The diode laser 10 is controlled by the current generator 16 and powered by a direct current over time. The diode laser 10 is preferably current stabilized.

In an embodiment of the invention, the diode laser 10 is temperature stabilized by means of a servo system known per se. Thus for a given temperature, the wavelength is substantially proportional to the diode lasers current.

An alternating component, generated by the modulation means 17, is then superimposed onto the direct current of the diode laser 10 to modulate the diode laser.

The modulation means 17 comprise:
- a first modulation means able to generate a first modulation 171, high frequency and low modulation amplitude, of the current of the diode laser 10,
- a second modulation means able to generate a second modulation 172, low frequency and high modulation amplitude, of the current of the diode laser 10.

The beam emitted on output from the diode laser 10, before being introduced into the optical fiber 11, is a wavelength modulated beam. However, the signal current modulation of the diode laser is also accompanied by a variation in the power of said diode laser, which leads to a variation in the amplitude of the current detected by the detection means, a parasitic variation that is overcome by compensation means contained in the calculation means 18.

The use of a double modulation of the beam from the diode laser will make it possible to obtain the information about the displacement of the target and also its direction, regardless of the amplitude of the displacement, irrespective of whether it is greater than or less than the half-wavelength of the diode laser.

The choice of frequencies and amplitudes of each modulation is therefore essential.

a) Choice of the Current Amplitude and Frequency of the First Modulation:

To obtain the signals $V_x$ and $V_y$, and deduce from them information about the displacement of the target and its direction, a modulation technique developed in the invention consists of modulating the wavelength of the laser source to two wavelengths $\lambda_1$ to $\lambda_2$ around the central wavelength $\lambda$ through the action of a current modulation of low amplitude at high frequency.

Choice of Frequency:

The choice of frequency results from a compromise. On the one hand, the frequency is preferably the highest possible, firstly so as to be able to measure rapid displacements of the target and secondly to perform the most correct (time) demultiplexing possible. On the other hand, the spectral response time of the diode laser must be taken into account.

The choice of the frequency is therefore limited technically by the spectral response time of the diode laser, generally several tens of microseconds.

In an example of realization, for a Modulight® ML1354 type DFB diode laser, the frequency can be 25 kHz.

Choice of the Modulation Current Amplitude:

The amplitude of this modulation must be adjusted so as to obtain a phase quadrature condition. Phase quadrature demodulation techniques for two signals, known per se, can then be used to remove the ambiguity as to the direction of the target's displacement.

Determining the Quadrature Condition:

The two signals $V_x$ and $V_y$ are time multiplexed in the signal measured by the detection means.

Starting from the assumption that the signals sought, $V_x$ and $V_y$, once demultiplexed, and corresponding respectively to $\lambda_1$ and $\lambda_2$, are expressed as:

$$V_x = V_{0x} + V_{mx}\cos(\theta_1) \tag{7a}$$

$$V_y = V_{0y} + V_{my}\cos(\theta_2) \tag{7b}$$

$$\text{with: } \theta_1 = \frac{4\pi n}{\lambda_1}d \tag{8a}$$

$$\text{and } \theta_2 = \frac{4\pi n}{\lambda_2}d \tag{8b}$$

$\theta_2 - \theta_1$ is therefore given by:

$$\theta_2 - \theta_1 = 4\pi n d\left(\frac{\lambda_1 - \lambda_2}{\lambda_1 \lambda_2}\right) \tag{9}$$

If it is considered that $\Delta\lambda = \lambda_2 - \lambda_1$ is very small with respect to the central wavelength emitted $\lambda$, it is possible to approximate $\lambda_1 \lambda_2 \approx \lambda^2$.

Thus, to obtain the quadrature condition, it is necessary that:

$$\theta_2 - \theta_1 = \frac{\pi}{2} \tag{10}$$

i.e.:

$$4\pi n d\left(\frac{\Delta\lambda}{\lambda^2}\right) = \frac{\pi}{2} \tag{11}$$

The quadrature condition is therefore given by:

$$\frac{\Delta\lambda}{\lambda^2} = \frac{1}{8nd} \tag{12}$$

For a given temperature, the wavelength being substantially proportional to the current of the diode laser, it is thus possible to deduce from this the modulation current amplitude.

b) Choice of the Current Amplitude and Frequency of the Second Modulation:

To overcome the limitations mentioned in the state of the art, namely to detect an amplitude of the displacement of the target less than the half-wavelength of the diode laser, a modulation technique developed in the invention consists in the current modulation, at high amplitude, of the signal from the diode laser at low frequency. This modulation causes an artificial displacement of amplitude greater than the half-wavelength of the diode laser, which allows the extrema of the signals to be measured, even for displacement amplitudes of the target less than the half-wavelength of the diode laser.

Choice of Frequency:

The low frequency must preferably be much lower than the frequency of the first (high-frequency) modulation. A high limit of the low frequency of modulation is, for example, at least 10 to 1000 times lower than the frequency of the first modulation and preferably, so as to be able to disassociate the two frequencies, of the order of a thousand times lower. A low limit of the low frequency of modulation is, for example, a frequency greater than frequencies of power variations due to the variation in the power of the diode laser and/or power variations due to the aging of the components used, such as, for example, the diode laser, the optical fibers, the connectors, the optics (collimating lens), the degradation in the target's surface condition. These said variations have a frequency generally much less than one hertz. This low limit of the low frequency of modulation makes it possible to disassociate these frequencies from power variations.

The main criterion for selecting the frequency is the fact that the greatest possible precision is sought for the parameters $V_{x\_max}$, $V_{x\_min}$, $V_{y\_max}$, $V_{y\_min}$ of signals $V_x$, $V_y$. This low frequency thus essentially depends on measurement conditions according to the application targeted as well as power variations mentioned previously.

In an embodiment, the frequency is of the order of 1 Hz.

Choice of the Modulation Current Amplitude:

Thus, to generate this artificial displacement, the low-frequency modulation current amplitude must fulfill the following condition, for a distance d from the target:

$$\theta_2 - \theta_1 \geq 2\pi \tag{13}$$

i.e.:

$$4\pi n d\left(\frac{\Delta\lambda}{\lambda^2}\right) \geq 2\pi \tag{14}$$

The condition concerning the wavelength variation is therefore given by:

$$\frac{\Delta\lambda}{\lambda^2} \geq \frac{1}{2nd} \tag{15}$$

For a given temperature, the wavelength being substantially proportional to the current of the diode laser, it is thus possible to deduce from this the modulation current amplitude.

In a proposed example of realization, the first (high-frequency) modulation is a rectangular modulation, and the second (low-frequency) modulation is a triangular modulation. But other shapes of modulations can be used. Thus, the high-frequency modulation can also be a sine wave or triangular modulation, and the low-frequency modulation can be a sine wave modulation.

The modulation means 17 are known per se and will not be described.

The optical fibers 11, 13, 14 are preferably monomode at the wavelength of the diode laser.

The optical fibers 11, 13, 14, the coupler 12 and all the means for linking (connectics) the various elements to each other, are of a standard type and will not be described here.

A collimator 19 is interposed between the extremity of the fiber and the target.

Preferably, the collimator 19 is used for the displacement measurement of targets located at distances d greater than several millimeters. It is not necessary for distances d less than several millimeters.

The collimator 19, preferably with anti-reflection treatment, is chosen firstly so as to receive a beam coming from the measurement fiber 13 and to collimate said beam in the direction of the target 2 and secondly to receive a fraction of the beam reflected by the target and to focus it towards the measurement fiber 13.

In a preferred example of collimator, said collimator is a doublet lens.

In another example, the extremity of the fiber 131 is a lens and serves as a collimator.

The target 2 is in motion, as indicated schematically as an example by the arrow 22, along the optical axis XX'.

The measurement device 1 according to the invention is therefore designed to measure the projection of the target's displacement along the direction of the optical axis XX'.

The target 2 is designed to receive at least a portion of the light beam coming from the measurement fiber 13 and presents a surface 21 to reflect said light beam.

Preferably, the surface 21 of the target 2 is substantially flat and substantially perpendicular to the optical axis XX' so as to obtain the best possible precision. However, a flat surface and perpendicularity with respect to the optical axis are not essential in order to obtain a measurement of the displacement of the target according to the invention. Other forms of surface can be used provided that they reflect at least a portion of the measurement beam towards the measurement fiber.

In cases where the displacement is not perpendicular, the measurement of the displacement of the target shall be performed according to the projection along the optical axis XX'.

In an example of realization, the target 2 can be a portion of an object whose displacement must be measured.

Alternatively, the target 2 can be separate from the object but attached to the object, such that the measurement of the displacement of the target is equivalent to the measurement of the displacement of the object.

When the target 2 is moving along the optical axis XX', an optical path traveled by the beam coming from the diode laser changes, the beams referred to firstly as the reference beam (fraction of the beam reflected at the extremity of the fiber) and secondly as the measurement beam (fraction of the beam reflected onto the target) interfere, generating a multiplexed interferometric signal representative of a variation in optical intensity due to the displacement of the target.

The measurement means 15 detects the variation in optical intensity, which is then converted into an electrically modulated signal, as a function of the target's displacement. This signal can be, for example, a voltage signal.

The measurement means 15 is preferably a photo-detector.

Calculation means 18 then acquire the signal measured by the photo-detector 15 and the modulation signal of the diode laser 10 generated by the modulation means 17 to process them in order to obtain a displacement measurement.

The calculation means 18 comprise:
means for demultiplexing 181 the signal detected by the photo-detector 15 to obtain the two signals $V_x$ and $V_y$,
means for amplitude compensating 184 the signals $V_x$ and $V_y$,
demodulation means 182 to obtain the phase difference $\theta$,
conversion means 183 to reconstitute the displacement.

The demultiplexing means 181 are known per se and will not be described. They allow the two signals $V_x$ and $V_y$ to be obtained, by synchronization with the high frequency of the first modulation 171.

The compensation means 184 make it possible to compensate for a parasitic variation in amplitude due to the power variation during the current modulation of the signal of the diode laser.

The phase difference $\theta$ is then calculated by the demodulation means 182 based on the two amplitude compensated signals $V_x$ and $V_y$.

In an example of realization, the demodulation means 182 use an arc-tangent demodulation method to reconstitute the displacement of the target 2 and its direction.

The two amplitude compensated signals $V_x$ and $V_y$ are expressed as:

$$V_x = V_{0x} + V_{mx}\cos(\theta) \quad (16a)$$

$$V_y = V_{0y} + V_{my}\sin(\theta) \quad (16b)$$

$$\text{If: } B_x = \cos(\theta) = \frac{V_x - V_{0x}}{V_{mx}} \in [-1, +1] \quad (17a)$$

$$B_y = \sin(\theta) = \frac{V_y - V_{0y}}{V_{my}} \in [-1, +1] \quad (17b)$$

Then $\theta$ is calculated by:

$$\theta = \pi + \arctan2\left(\frac{B_y}{B_x}\right) \theta \in [0, 2\pi] \quad (18)$$

The parameters $V_{0x}$, $V_{mx}$, $V_{0y}$, $V_{my}$ are calculated from formulas given by the relationships (6a) to (6d). The parameters $V_{x\_max}$, $V_{x\_min}$, $V_{y\_max}$, $V_{y\_min}$ therefore need to be obtained.

In the case where the physical parameter's amplitude of variation is greater than the half-wavelength of the light source, the interferometric signal detected by the detection means comprises at least one complete interference fringe, which allows the parameters $V_{x\_max}$, $V_{x\_min}$, $V_{y\_max}$, $V_{y\_min}$ to be determined.

In the case where the physical parameter's amplitude of variation is less than the half-wavelength of the light source, the interferometric signal detected by the detection means does not comprise a complete interference fringe. The parameters $V_{x\_max}$, $V_{x\_min}$, $V_{y\_max}$, $V_{y\_min}$ cannot be measured directly. The second (low-frequency) modulation of the modulated signal will make it possible to create at least one artificial complete interference fringe in order to obtain parameters $V_{x\_max}$, $V_{x\_min}$, $V_{y\_max}$, $V_{y\_min}$.

The second modulation can be emitted either continuously or intermittently, at the beginning of or during acquisition. In order to determine the actual displacement of the target, it is sufficient to subtract the artificial displacement from the displacement measured.

The displacement of the target 2 and its direction are then calculated by conversion means 183.

In an example of realization, the conversion means 183 use an incremental method, called "Phase-tracking demodulation", to reconstruct the displacement of the target from the phase difference θ calculated by the demodulation means.

Thus, if $\theta_n$ represents the phase difference measured in step n and $\theta_{n-1}$ that measured in step n−1, the corresponding reconstituted incremental phase difference is given by the relationship:

$$d_n = d_{n-1} + \frac{\theta_n - \theta_{n-1}}{4\pi n}\lambda = d_{n-1} + \frac{\Delta}{\delta} \qquad (19)$$

where $\Delta=(\theta_n-\theta_{n-1})$ and $\delta=(4\pi n/\lambda)$.

Note that the above relationship (19) allows only a relative displacement to be calculated, with $\theta_0=0$ and $d_0=0$.

EXAMPLE

In order to illustrate the reconstituted displacement of the target 2 from the measurement device 1 according to the invention, one example illustrates the reconstitution of the displacement of a target with amplitude greater than the half-wavelength of the diode laser and another example illustrates the reconstitution of the displacement of a target with amplitude less than the half-wavelength of the diode laser.

For these two examples:
the laser light source 10 is a Modulight® ML1354 type DFB diode laser emitting a central wavelength λ of 1310 nm. The diode laser is powered by a 30 mA injection current and has a maximum output power of 6 mW,
the fibers 11, 13, 14 are Corning® SMF-28 type fibers,
the optical coupler 12 is a 1*2 SMF 28 coupler from the China Daheng Group,
the target 2 is positioned at a distance of 50 mm from the extremity of the measurement fiber 13, and its displacement is generated by a Physik Instrumente® (PI) P-753.2CD type of piezoelectric transducer. This piezoelectric transducer is coupled to a capacitive sensor to directly measure the displacement of the piezoelectric transducer, with static precision of 2 nm.

The first (high-frequency) modulation is a rectangular modulation of frequency 25 kHz.

The second (low-frequency) modulation is a triangular modulation of frequency 1.2 Hz.

The spectral response of the laser source with respect to the injected current is measured at ~9.2 pm/mA. The amplitude of the first modulation required to obtain the phase quadrature is Δ/~0.466 mA (hence equivalent to Δλ=4.29 pm) for a measurement fiber/target distance d=50 mm and a medium with index n=1, air.

Example 1

Displacement of a Target with Amplitude Greater than the Half-Wavelength of the Diode Laser The results are presented in FIGS. 3a to 3f. The signals are represented over a measurement range of 190 ms.

Figure 3:
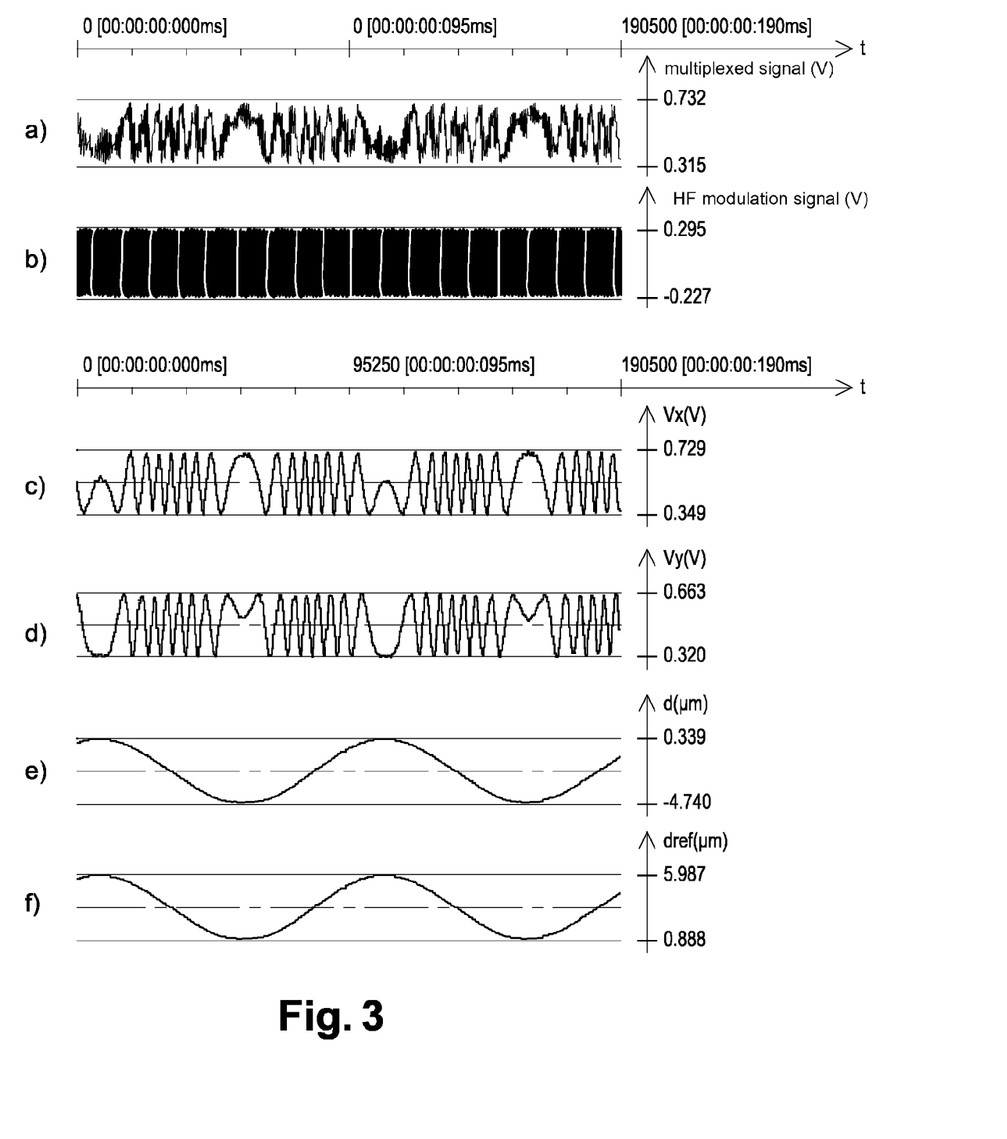
FIG. 3a illustrates a multiplexed signal detected by a detection means in an example of realization of a target moving with an amplitude of variation greater than the half-wavelength of the light source.
FIG. 3b illustrates the first, high frequency, modulation of a current modulated signal from the light source.
FIG. 3c illustrates the demultiplexed signal $V_x$, after processing by the means for demultiplexing and compensating the signal detected by a detection means.
FIG. 3d illustrates the demultiplexed signal $V_y$, after processing by the means for demultiplexing and compensating the signal detected by a detection means.
FIG. 3e illustrates the target's displacement signal reconstituted via the device according to the first embodiment of the invention.
FIG. 3f illustrates the reference displacement of the target.

FIG. 3a represents the multiplexed signal detected by the photo-detector.

FIG. 3b represents the signal representative of the first (high-frequency) modulation of the diode laser.

FIG. 3c represents the demultiplexed signal $V_x$, after processing by the means for demultiplexing and compensating the signal detected by the photo-detector.

FIG. 3d represents the demultiplexed signal $V_y$, after processing by the means for demultiplexing and compensating the signal detected by the photo-detector.

FIG. 3e represents the target's reconstituted displacement signal.

FIG. 3f represents the reference signal of the target's displacement.

FIGS. 4a to 4f are enlargements of an area of the measurement range of FIGS. 3a to 3f, respectively. The signals are represented over a measurement range of 2 ms.

Figure 4:
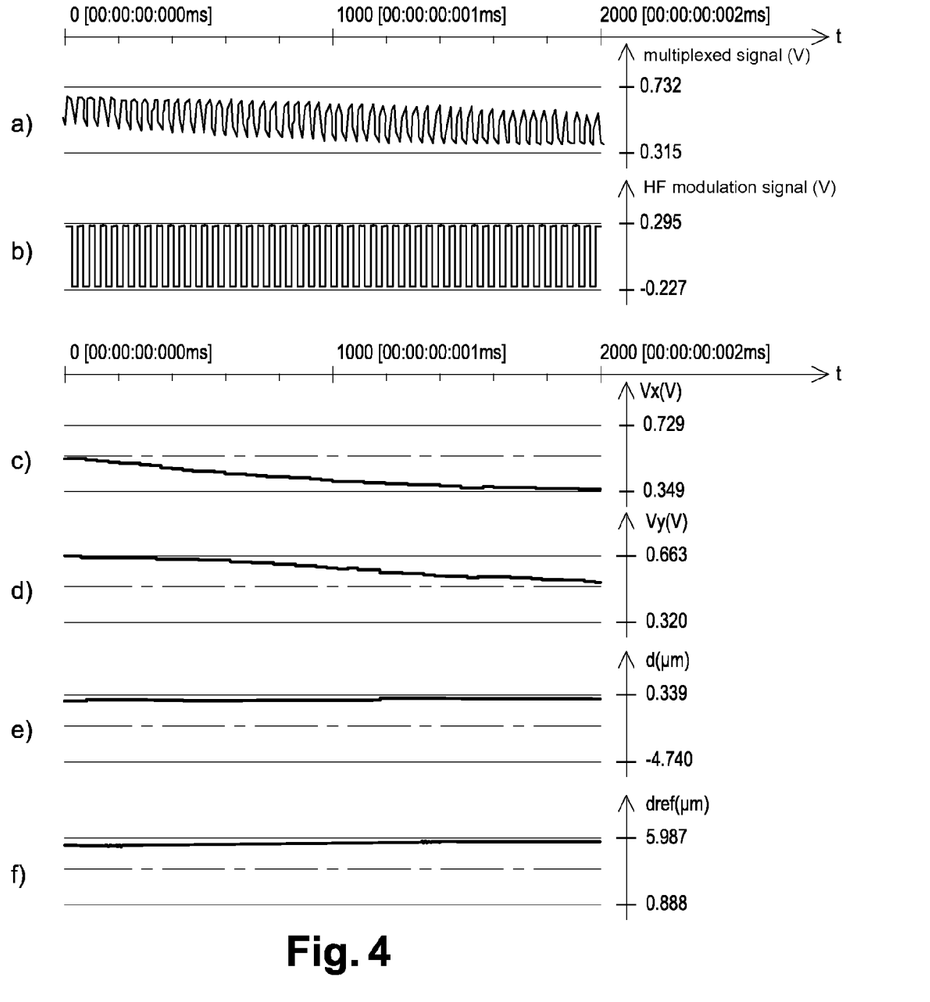
FIGS. 4a to 4f illustrate enlargements of an acquisition area of FIGS. 3a to 3f, respectively.

It can be seen that the target's reconstituted displacement signal is very close to the reference signal.

Figure 5:
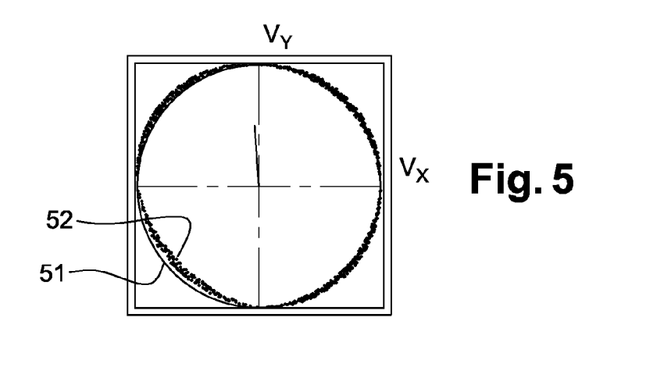
FIG. 5 illustrates a Lissajous phase diagram of signals $V_x$ and $V_y$ of FIGS. 3c and 3d.

FIG. 5 is a Lissajous figure representing the signals $V_x$–$V_y$ of FIGS. 3c and 3d. This figure makes it possible to illustrate the target's displacement. In effect, when the target's displacement has an amplitude equivalent to the half-wavelength of the diode laser, its representation in a $V_y$-$V_x$ Lissajous diagram is illustrated by the trace 51 and is equivalent to a complete circle. The trace 52 is representative of the amplitude of the target's displacement. It can be seen that this trace 52 represents at least one turn of the circle. The amplitude of the target's displacement is therefore greater than or equal to the half-wavelength of the diode laser.

Example 2

Figure 6:
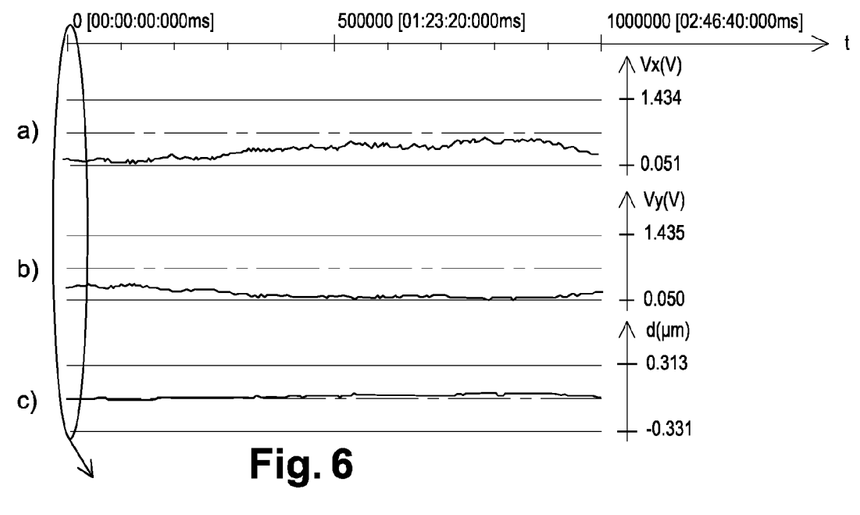

Displacement of a Target with Amplitude Less than the Half-Wavelength of the Diode Laser The results are presented in FIGS. 6a to 6c. The signals are represented over a measurement range of 2 h46 nm40 s.

FIG. 6a represents the demultiplexed signal $V_x$, after processing by the means for demultiplexing and compensating the signal detected by the photo-detector.

FIG. 6b represents the demultiplexed signal $V_y$, after processing by the means for demultiplexing and compensating the signal detected by the photo-detector.

FIG. 6c represents the target's reconstituted displacement signal.

Figure 7:
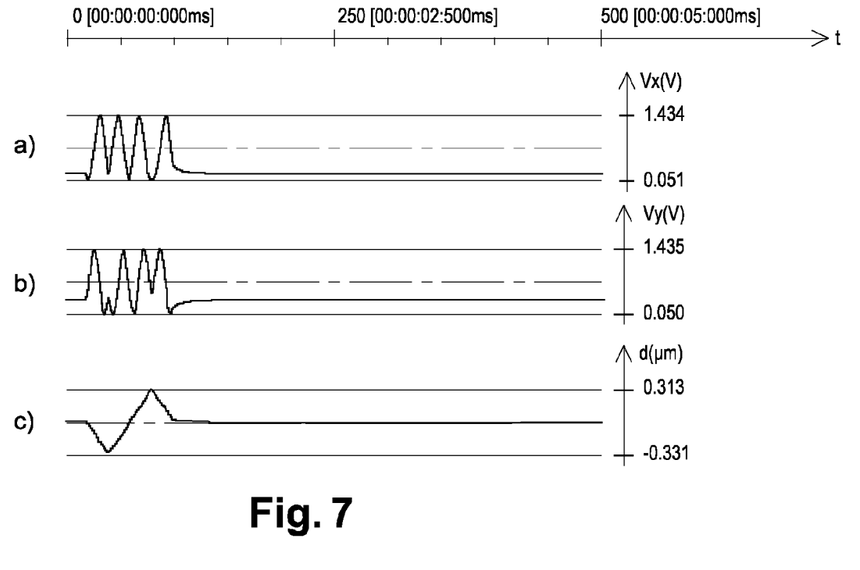

FIGS. 7a to 7c are enlargements of an area of the measurement range of FIGS. 6a to 6c, respectively. The signals are represented over a measurement range of 5 s.

Figure 8:
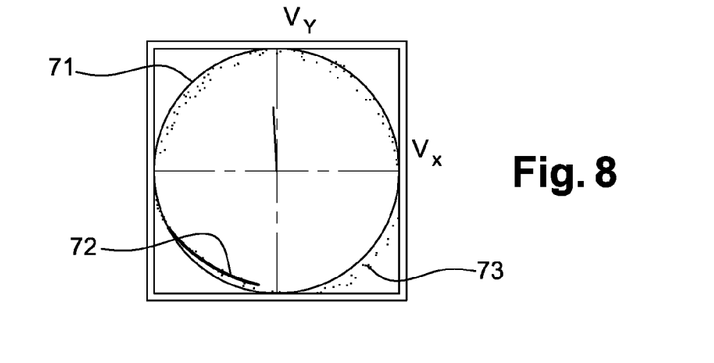
FIG. 8 illustrates a Lissajous phase diagram of signals $V_x$ and $V_y$ of FIGS. 6a and 6b.

FIG. 8 is a Lissajous figure representing the signals $V_x$ and $V_y$ of FIGS. 6a and 6b. This figure clearly reveals the small displacement of the target. In effect, when the target's displacement has an amplitude equivalent to the half-wavelength of the diode laser, its representation in a $V_y$-$V_x$ Lissajous diagram is illustrated by the trace 71 and is equivalent to a complete circle. The trace 72 is representative of the amplitude of the target's displacement. It can be seen that this trace 72 does not represent even a quarter circle. The amplitude of the target's displacement is therefore less than the half-wavelength of the diode laser. The trace 73 represented by discontinuous dotted lines is representative of the artificial displacement created by the second (low frequency) modulation to determine the parameters $V_{x\_max}$, $V_{x\_min}$, $V_{y\_max}$, $V_{y\_min}$.

These two examples make it possible to show that the measurement device according to the invention allows the displacement of a target and its direction to be reconstituted, regardless of the amplitude of the displacement.

In a realization variant, it is possible to envisage a measurement system formed by N optical cavities positioned along N substantially parallel or different axes for the joint measurement of one single target or N targets.

Figure 9:
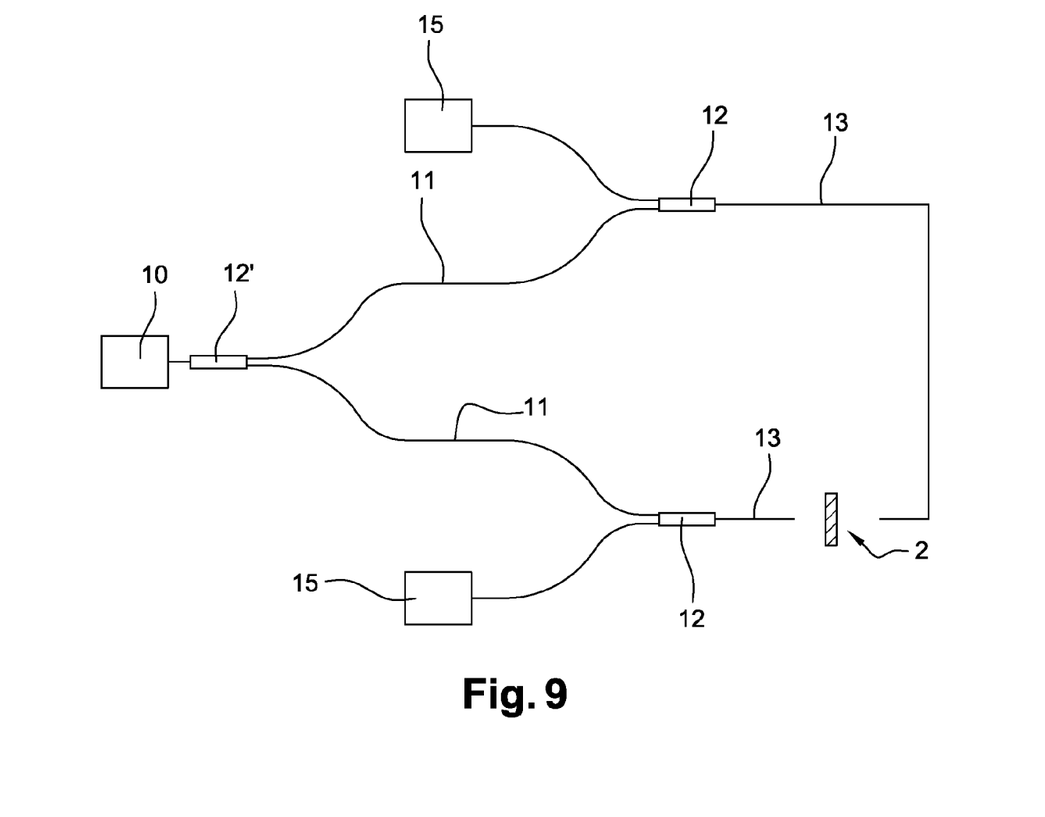
FIG. 9 illustrates a schematic diagram of the measuring extrinsic optical fiber device according to another embodiment of the invention.

The common basis for this system is the diode laser 10 and the modulation means 17.

The beam from the common diode laser 10 is split, via a 1*N-port coupler 12', into N beams, each beam propagating, via a fiber 11, to a coupler 12 then to a measurement fiber 13 and a Fabry-Perot optical cavity. An interferometric signal generated by the displacement of a target of an optical cavity is detected by a photo-detector 15. The signals measured by each photo-detector 15 are acquired by calculation means 18 which, after processing, reconstitute the looked-for displacement or displacements of one or more targets for each Fabry-Perot optical cavity.

In a first embodiment of the system, the target 2 is different for each Fabry-Perot optical cavity.

The N Fabry-Perot optical cavities are positioned either along different axes or along substantially parallel axes.

In another embodiment of the system, the target 2 is common to all N Fabry-Perot optical cavities. This mode allows redundant measurement of the target's displacements.

The N Fabry-Perot optical cavities are positioned either along different axes for the joint measurement of a target's transverse displacement or along substantially parallel axes.

In a particular example, as illustrated in FIG. 9, where the system comprises two Fabry-Perot optical cavities, said Fabry-Perot optical cavities are positioned along the same axis, either side of the target 2. This system enables the differential measurement of said target's displacement. This system also has the advantage of compensating for small variations in wavelength of the diode laser.

The invention claimed is:

1. Extrinsic optical fiber device (1) for measuring a physical parameter, comprising:
    a light source (10), of central wavelength λ, to generate a light beam in the direction of a target,
    an optical fiber (13), called the measurement fiber, to transport and guide the light beam towards a target, one extremity of said optical fiber, placed facing the target, forming with the target an optical cavity,
    a means (15) for detecting an interferometric signal, said interferometric signal comprising the information about the physical parameter to be determined, and being generated by interference between a reference light beam and a measurement beam, said reference light beam corresponding to a fraction of the light beam from the light source that is reflected by the extremity of the fiber, and said measurement light beam corresponding to a fraction of the light beam from the light source that is reflected by the target and travels an optical path in the optical cavity whose variation is a function of the physical parameter to be determined,
    means (17) for modulating a signal emitted by the light source,
    means (18) for calculating the physical parameter on the basis of the interferometric signal measured by the detection means (15),
    wherein the light source consists of a laser source and in that the modulated signal from the light source (10) comprises an alternating component comprising a double frequency modulation generated by the modulation means, and
    wherein the double modulation comprises a first high-frequency modulation and a second low-frequency modulation.

2. Extrinsic optical fiber device (1) according to claim 1, wherein the laser source is a diode laser.

3. Extrinsic optical fiber device (1) according to claim 1 wherein the first high frequency modulation comprises a low modulation amplitude of a current of the light source.

4. Extrinsic optical fiber device (1) according to claim 1 wherein the second low frequency modulation comprises a high modulation amplitude of a current of the light source.

5. Extrinsic optical fiber device (1) according to claim 3 wherein the second low frequency modulation comprises a high modulation amplitude of a current of the light source.

6. Extrinsic optical fiber device (1) for measuring a physical parameter, comprising:
    a light source (10), of central wavelength λ, to generate a light beam in the direction of a target,
    an optical fiber (13), called the measurement fiber, to transport and guide the light beam towards a target, one extremity of said optical fiber, placed facing the target, forming with the target an optical cavity,
    a means (15) for detecting an interferometric signal, said interferometric signal comprising the information about the physical parameter to be determined, and being generated by interference between a reference light beam and a measurement beam, said reference light beam corresponding to a fraction of the light beam from the light source that is reflected by the extremity of the fiber, and said measurement light beam corresponding to a fraction of the light beam from the light source that is reflected by the target and travels an optical path in the optical cavity whose variation is a function of the physical parameter to be determined,
    means (17) for modulating a signal emitted by the light source,
    means (18) for calculating the physical parameter on the basis of the interferometric signal measured by the detection means (15),
    wherein the light source consists of a laser source and in that the modulated signal from the light source (10) comprises an alternating component comprising a double frequency modulation generated by the modulation means,
    wherein the calculation means (18) comprise means for demultiplexing (181) the signal measured by the detection means and means for amplitude compensating (184) the demultiplexed signals coming from the demultiplexing means (181),
    wherein the calculation means (18) comprise means for demodulating (182) signals obtained on output from the compensation means (184) and means for converting (183) the signal obtained on output from the demodulation means (182),
    wherein the double modulation comprises a first high-frequency modulation and a second low-frequency modulation.

7. Extrinsic optical fiber device (1) according to claim 6 wherein the first high frequency modulation comprises a low modulation amplitude of a current of the light source.

8. Extrinsic optical fiber device (1) according to claim 6 wherein the second low frequency modulation comprises a high modulation amplitude of a current of the light source.

9. Extrinsic optical fiber device (1) according to claim 7 wherein the second low frequency modulation comprises a high modulation amplitude of a current of the light source.

10. Extrinsic optical fiber device (1) for measuring a physical parameter, comprising:
    a light source (10), of central wavelength λ, to generate a light beam in the direction of a target,
    an optical fiber (13), called the measurement fiber, to transport and guide the light beam towards a target, one extremity of said optical fiber, placed facing the target, forming with the target an optical cavity, a means (15) for detecting an interferometric signal, said interferometric signal comprising the information about the physical parameter to be determined, and being generated by interference between a reference light beam and a measurement beam, said reference light beam corresponding to a fraction of the light beam from the light source that is reflected by the extremity of the fiber, and said measurement light beam corresponding to a fraction of the light beam from the light source that is reflected by the target and travels an optical path in the optical cavity whose variation is a function of the physical parameter to be determined, means (17) for modulating a signal emitted by the light source, means (18) for calculating the physical parameter on the basis of the interferometric signal measured by the detection means (15), wherein the light source consists of a laser source and in that the modulated signal from the light source (10) comprises an alternating component comprising a double frequency modulation generated by the modulation means, wherein the laser source is a diode laser, and wherein the double modulation comprises a first high-frequency modulation and a second low-frequency modulation.

11. Extrinsic optical fiber device (1) for the measurement along an axis XX' of a displacement of a target (2) comprising:

a light source (10), of central wavelength $\lambda$, to generate a light beam in the direction of a target, an optical fiber (13), called the measurement fiber, to transport and guide the light beam towards a target, one extremity of said optical fiber, placed facing the target, forming with the target an optical cavity, a means for detecting (15) an interferometric signal, said interferometric signal comprising the information about the displacement to be determined, and being generated by interference between a reference light beam and a measurement beam, said reference light beam corresponding to a fraction of the light beam from the light source that is reflected by the extremity of the fiber, and said measurement light beam corresponding to a fraction of the light beam from the light source that is reflected by the target and travels an optical path in the optical cavity whose variation is a function of the physical parameter to be determined, means (17) for modulating a signal emitted by the light source (10), means (18) for calculating the displacement on the basis of the interferometric signal measured by the detection means (15), wherein the light source consists of a laser source and in that the modulated signal from the light source (10) comprises an alternating component comprising a double frequency modulation generated by the modulation means, and wherein the double modulation comprises a first high-frequency modulation and a second low-frequency modulation.

12. Extrinsic optical fiber device (11) according to claim 11 wherein the laser source is a diode laser.

* * * * *